2,694,329

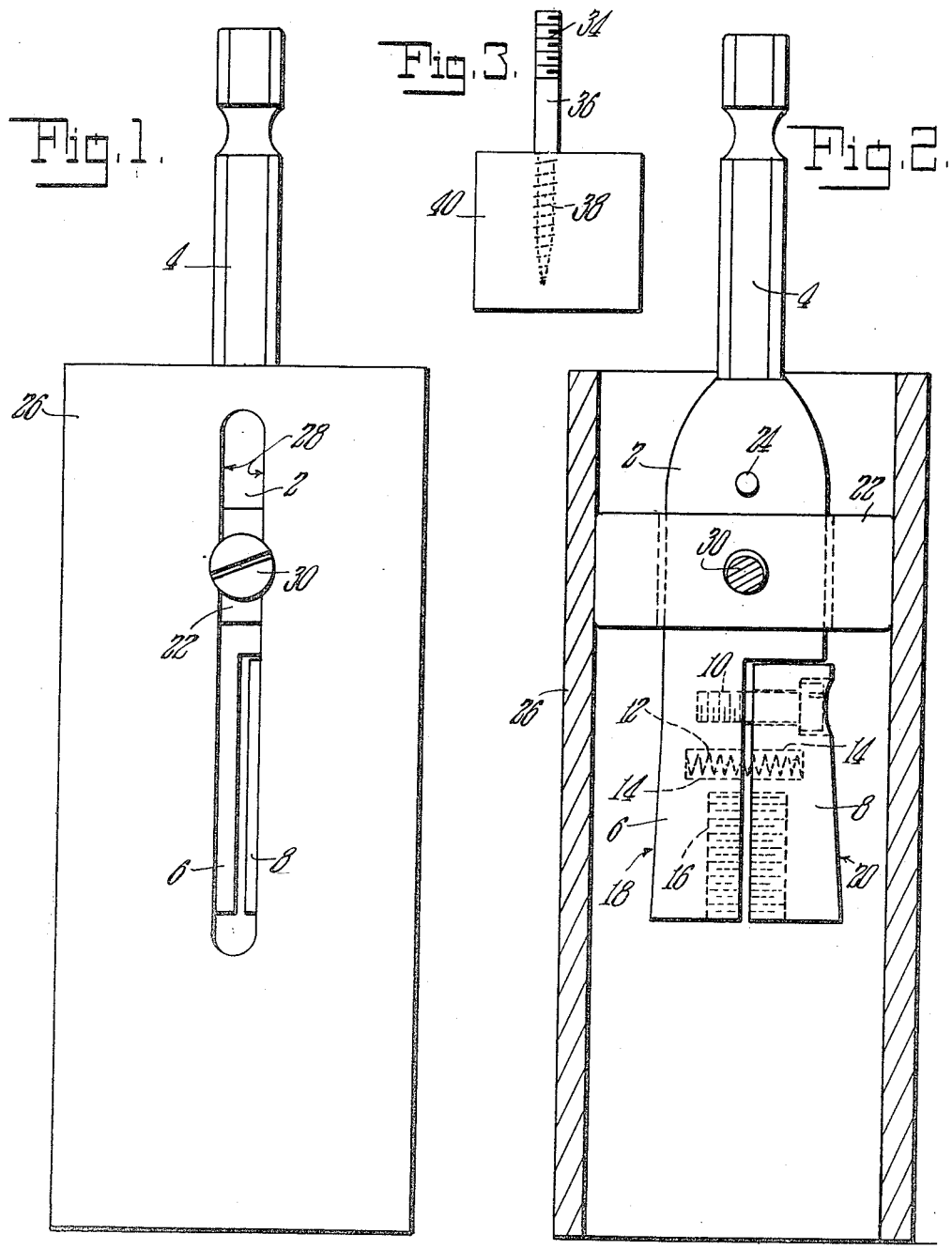

SCREW HOLDING AND DRIVING DEVICE

William G. Thompson and Frederick C. Macdonald, Clinton, Mass.

Application December 11, 1953, Serial No. 397,648

2 Claims. (Cl. 81—53)

This invention relates to improvements in screw holding and driving devices.

The principal objects of the invention are directed to the provision of a device for holding and driving various types of screws or bolts and while the invention will be described in connection with a screw or bolt used in furniture manufacture, it will be understood that the device may be used in connection with lag or other types of screws and/or bolts.

In furniture manufacture it is common practice to drive a screw into one furniture element which has a projecting threaded end for connection to another element, a nut being run onto the threaded end for securing the elements together.

The device of this invention is adapted to hold a screw member or bolt and is arranged to be rotated by the chuck of a power screwdriver so that the device may be operated at the work and avoid the present practice of moving the work to a machine for driving bolts or screws thereinto.

The device is characterized by means for easily and readily gripping a bolt or screw so that it may be driven or screwed into the work quickly and is constructed and arranged to release the screw when at the desired depth.

All of the above objects we accomplish by means of such structure and relative arrangements of parts thereof, as will fully appear by a perusal of the description below and by various specific features which will be hereinafter set forth.

To the above cited and other ends and with the foregoing and various other novel features and advantages and other objects of our invention as will become more readily apparent as the description proceeds, our invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of a screw holding and rotating device embodying the novel features of the invention;

Fig. 2 is a view similar to Fig. 1 with the outer stop and operating sleeve thereof in section; and Fig. 3 is an elevational view showing a screw driven or screwed into a work piece.

Referring now to the drawings more in detail, the invention will be fully described.

A body is represented by 2 which has an upper shank 4. The shank may be of any form desired and adapted to be gripped in the chuck of an electric drill by which the device is rotated.

The lower end or portion 6 of the body is substantially half round and a jaw 8 similar to the portion 6 is movable in and out radially on a guide which may be in the form of a screw 10. The screw will be arranged to limit outward movement of the jaw.

Means is provided to urge the jaw outwardly to its expanded position and such means may include a spring or springs such as 12 disposed in sockets 14 provided on adjacent inner sides of members 6 and 8. Springs of other forms may be used if desired.

The lower portion 6 of the body and jaw 8 are provided with a threaded socket 16 and the outer sides of the portion 6 and jaw 8 have downwardly diverging sides such as 18 and 20.

An operating collar 22 is freely slidable up and down on the body and is adapted as it moves downwardly thereon to encircle the lower part of the body and jaw so as to move the jaw radially inwardly to retracted position so that the threaded socket arrangement of the portion 6 and jaw 8 form a threaded hole. A stop pin 24 is provided on the body to limit upward movement of the collar 22.

The lower end of the body and the jaw provide means which in retracted relation grip a bolt, screw or the like and when in expanded relation they release the same.

An actuating and stop sleeve 26 is slidable up and down on the collar 22 and is provided with a longitudinal slot 28 on one or opposite sides thereof.

A screw 30 in threaded engagement with the body extends through the slot 28 of the sleeve and is arranged to lock the sleeve on the collar in various positions relative thereto.

The sleeve 26 being secured to the collar 22 it is used to move the collar up and down on the body to act on and move the jaw inwardly and to release it.

With the jaw in inner position the upper threaded end 34 of a screw 36 is gripped in the threaded socket of the body portion 6 and jaw 8. The screw 36 may be screwed into the socket 16 or the jaw may be closed onto the screw placed in the threaded socket portion of the body. In any event, the screw 36 is held by the body and jaw for rotation thereby.

The shank 4 of the device being held in the rotating chuck of a portable drill the lower end 38 of screw 36 is driven or screwed into member 40 which will ordinarily be provided with a hole of proper size for the screw.

While the sleeve 26 will operate to move the collar up and down, it may be set so that the lower end will bring up against the work when the screw 36 has been run into the work the desired depth. As the lower end of the sleeve engages the work continued movement of the body downwardly causes the collar to move upwardly on the body so that the jaw is released and thereby the upper threaded end of bolt 36 is released.

Bolts and screws are readily and easily gripped and released making it possible to quickly insert them into the work wherever it may be located thereby to obviate moving the work to machines where the work is usually done.

Sockets of various form may be provided in lieu of the threaded socket in the lower portion 6 of the body and the jaw 8 or secondary devices for holding and driving lag bolts and various forms of bolts and screws may be inserted in the socket shown.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A device arranged to be engaged and rotated by the chuck of a power screw-driver and adapted to engage and rotate a screw and release the same comprising in combination, an elongated vertically disposed body having a stem extending from the upper end thereof engageable by a chuck, a lower jaw portion of said body being half-rounded in cross section and provided with a radially extending guide member, a jaw half-round in cross section slidable on said guide member between screw gripping position adjacent the jaw portion of the body and a releasing position outwardly thereof, outer sides of said jaw portion of the body and jaw member diverging downwardly and said jaw portion and jaw member being provided with upwardly extending screw threads for gripping a screw in gripping position of the jaw, a collar having a bore loosely receiving the body for up and down movements therein and adapted to engage outer sides of the jaw portion of the body and jaw member in a lower position thereof to move the jaw member radially inwardly to gripping position, spring means on said guide member between the jaw portion of the body and jaw biasing the jaw member to releasing position, an elongated hollow sleeve around said collar and means adjustably securing said sleeve and collar in various relationships whereby said sleeve may move the collar up and down relative to the body, and means on said body limiting upward movement of the collar relative thereto.

2. A device set forth in claim 1 wherein the means securing said sleeve and collar includes an elongated slot provided in a wall of said sleeve and a headed binding screw extending through said slot and in threaded engagement with said collar.

References Cited in the file of this patent

UNITED STATES PATENTS

| Number | Name | Date |
|---|---|---|
| 1,583,554 | Hoover | May 4, 1926 |
| 1,694,628 | Sauveur | Dec. 11, 1928 |
| 1,807,264 | Walker | May 26, 1931 |
| 1,828,523 | Decker | Oct. 20, 1931 |
| 2,381,597 | Johnson | Aug. 7, 1945 |
| 2,434,354 | Emmons | Jan. 13, 1948 |
| 2,497,214 | Dreyer | Feb. 14, 1950 |